United States Patent [19]

Freeborn

[11] 4,242,985
[45] Jan. 6, 1981

[54] ANIMAL ACTUATED FEEDER

[75] Inventor: William D. Freeborn, Smith Center, Kans.

[73] Assignee: Osborne Industries, Inc., Osborne, Kans.

[21] Appl. No.: 32,177

[22] Filed: Apr. 23, 1979

[51] Int. Cl.$^3$ ............................................. A01K 5/00
[52] U.S. Cl. ............................................. 119/54
[58] Field of Search .............................. 119/54, 53.5

[56] References Cited

U.S. PATENT DOCUMENTS

| | | | |
|---|---|---|---|
| 961,779 | 6/1910 | Kellum | 119/54 |
| 1,222,556 | 4/1917 | McCormick | 119/54 |
| 1,239,116 | 9/1917 | Lindquist | 119/54 |
| 1,276,884 | 8/1918 | Dierks | 119/54 |
| 1,326,273 | 12/1919 | Knutson | 119/53.5 |
| 1,336,320 | 4/1920 | Schumacher | 119/54 |
| 1,355,435 | 10/1920 | Unger et al. | 119/54 |
| 1,387,997 | 8/1921 | Page | 119/54 |
| 1,399,716 | 12/1921 | Riner | 119/54 |
| 1,419,950 | 6/1922 | Shaw | 119/53.5 |
| 1,524,619 | 1/1925 | Harrington | 119/54 |
| 1,695,597 | 12/1928 | Lydon | 119/54 |
| 1,719,245 | 7/1929 | Smidley | 119/54 |
| 1,881,820 | 10/1932 | McCullough et al. | 119/54 |
| 1,926,641 | 9/1933 | White | 119/53 |
| 2,153,455 | 4/1939 | Casper et al. | 119/54 |
| 2,234,041 | 3/1941 | Chandler | 119/54 |
| 2,275,887 | 3/1942 | Chandler | 119/56 |
| 2,352,859 | 7/1944 | Palmer | 119/54 |
| 2,408,477 | 10/1946 | Payne | 119/54 |
| 2,417,484 | 3/1947 | Gifford et al. | 119/53.5 |
| 2,494,950 | 1/1950 | Lee | 119/53.5 |
| 2,513,200 | 6/1950 | Pax | 119/53.5 |
| 2,536,787 | 1/1951 | Turner | 119/54 |
| 2,642,838 | 6/1953 | Fields | 119/53.5 |
| 2,650,566 | 9/1953 | Rook | 119/53.5 |
| 2,966,135 | 12/1960 | Kelly et al. | 119/53.5 |
| 3,019,766 | 2/1962 | Pannier | 119/53.5 |
| 3,033,164 | 5/1962 | Evers | 119/54 |
| 3,067,722 | 12/1962 | Strong | 119/53.5 |
| 3,125,070 | 3/1964 | Shrimplin | 119/53.5 |
| 3,503,372 | 3/1970 | Saurer | 119/55 |
| 3,552,360 | 1/1971 | Nelson | 119/53.5 |
| 3,780,701 | 12/1973 | Wentworth, Sr. | 119/51 R |
| 3,812,823 | 5/1974 | Ridder et al. | 119/54 |
| 3,951,107 | 4/1976 | Doty | 119/52 R |

Primary Examiner—Hugh R. Chamblee
Attorney, Agent, or Firm—Fishburn, Gold & Litman

[57] ABSTRACT

An animal feeding device in which the animal actuates the transfer of the feed from a sheltered feed storage hopper to a feeding station by working a lever or similar device. The feed hopper is positioned above the feeding station, whereby the feed will transfer by gravity therebetween. A rotatable cylinder having pockets therein is positioned between the storage hopper and the feeding station so as to block gravity flow of the feed. A rod is fixedly attached to the rotatable cylinder and extends outwardly into the feeding station, such that the animal may swing the rod from side to side thereby rotating the cylinder back and forth. The rotation of the cylinder alternatively causes the pockets therein to fill with feed and to empty into the feeding station. A dampening mechanism is provided which senses accumulation of feed in the feeding station and resists additional demand of feed by the animal. This dampening mechanism comprises an elongate bar also fixedly attached to the cylinder and extending into the accumulation of feed in the feeding station. The resistance bar increases the work required of the animal to actuate the demand mechanism substantially in proportion to the level of feed accumulation in the feeding station. A bridge breaking bar is also fixedly attached to the cylinder and extends upwardly into the hopper thereby facilitating the filling of the pockets on the cylinder.

8 Claims, 5 Drawing Figures

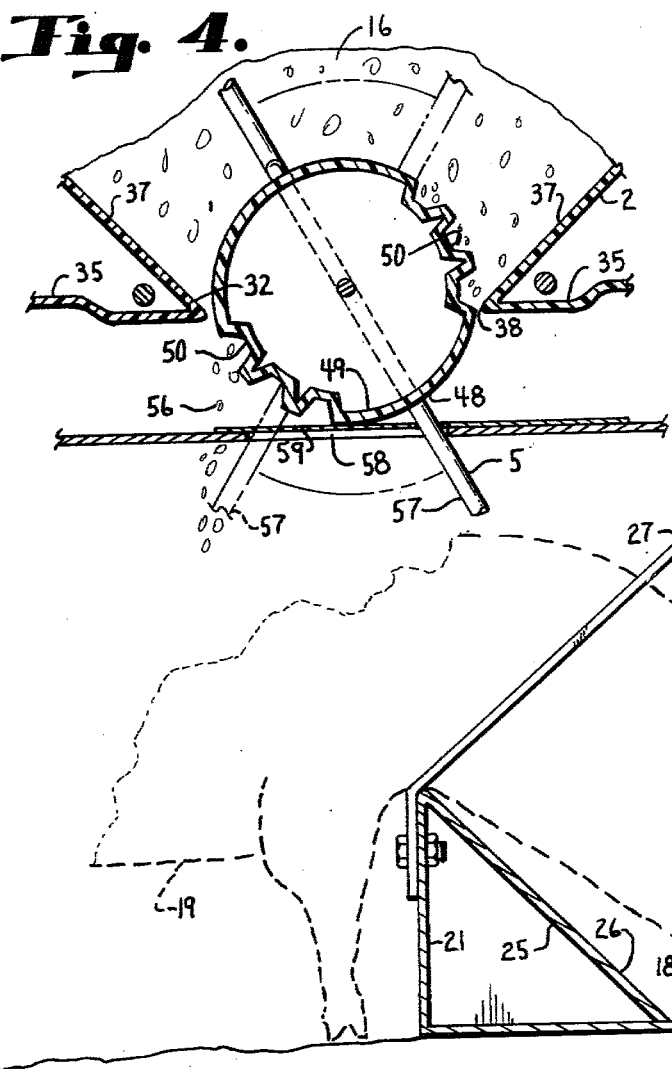
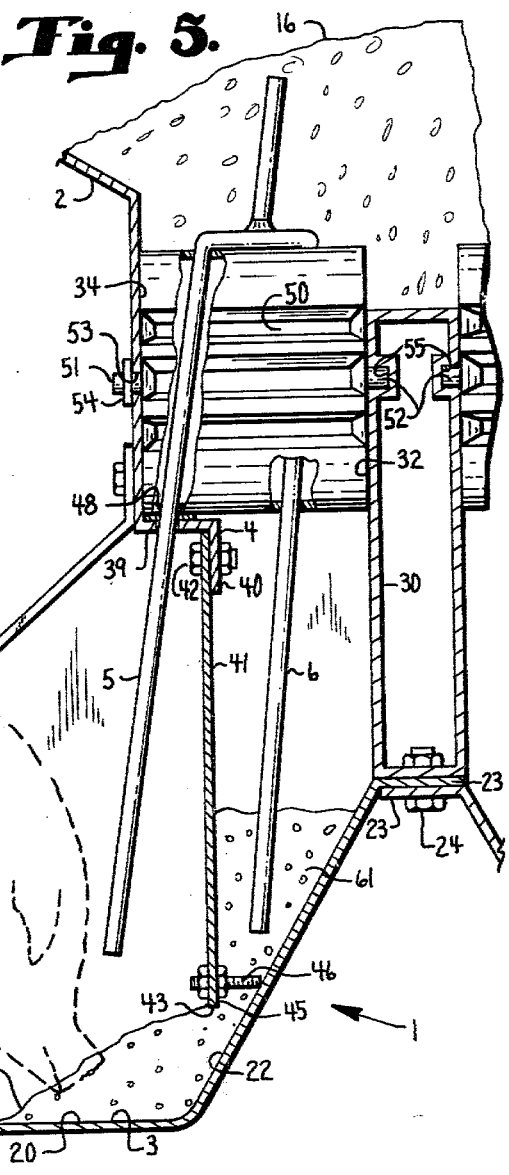

ANIMAL ACTUATED FEEDER

BACKGROUND OF THE INVENTION

This invention relates to a demand-type animal feeding device and in particular to such a device which has means therein for keeping excessive feed from being delivered to the feeding station.

Most domestic animal feeds are subject to spoilage by exposure to the elements, therefore it is normally preferable to keep such feed in an enclosed container until such time as the animal needs to feed. Fortunately most domesticated animals are sufficiently intelligent to demand transfer of feed from a container to a feeding station by actuation of some type of demand means. Animal feeders of this type are commonly used for such animals as hogs, dogs, and even chickens. Unfortunately, many animals, especially those of higher intelligence, enjoy playing with the feed demand actuator, thereby delivering more feed to their feeding station than is actually needed for satisfaction of their hunger. This excessive feed tends to be spoiled by rain and the other elements, scattered from the feeding station and thereby lost, and mixed with animal waste and mud, thereby also causing spoilage thereof. In addition, excessive feed sitting in a feeding station tends to develop a hard cake which enhances rotting and also tends to rust or decay the feeding station.

Hog feeding stations are especially susceptible to the above described problems, since hogs tend to get very bored in their caged environments and are also very intelligent. The hogs are always looking for something to play with. Thus the hogs will actually play with the feed transfer actuator until all such feed has been delivered from the storage compartment to the feeding station, even overflowing the latter. Most attempts to correct this problem previously have centered around trying to make the amount of feed transferred by each actuation of such a transfer very small, thereby requiring a great number of actuations to transfer the feed and discouraging the animal from doing such, unless it is very hungry. Unfortunately, as was stated, hogs actually enjoy this game of pushing the actuator and will continue it for great lengths of time. Therefore, it is desired to find some means of making it increasingly difficult for the animal to actuate the transfer of feed, as feed accumulates in the feeding station.

SUMMARY OF THE INVENTION

It is an object of the present invention to provide an animal feeder having an enclosed feed storage hopper, an animal feeding station, and a transfer means between the storage hopper and the feeding station wherein transfer of the feed thereinbetween is actuated by an animal; to provide such an animal feeder wherein increased accumulations of feed in the animal feeding station are sensed by a resistance device which makes further actuation of the feed transfer means increasingly difficult in proportion to the amount of feed accumulation; to provide such a resistance device which is mechanically simple, yet very effective in providing increased resistance as feed accumulations increase; to provide such a resistance device which comprises a rod or bar being attached to a movable actuating device and having a distal end which extends into the feed accumulation; and to provide such an animal feeder which is capable of an extended useful life, and is particularly well adapted for the proposed use thereof.

Other objects and advantages of this invention will become apparent from the following description taken in connection with the accompanying drawings wherein are set forth, by way of illustration and example, certain embodiments of this invention.

The present invention comprises a demand type animal feeder including means to restrain an animal from demanding more feed than the animal will consume. The feeder also incorporates particular structural elements which reduce damage or degradation of the feed. In this regard, the feeder comprises at least one animal feeding station, feed storage means removed from the feeding station, conveying means communicating the feed storage means with the feeding station and suitable for transferring feed therebetween, a mechanism blocking transfer of feed by the conveying means but being actuatable upon demand by an animal to allow such a transfer, and a dampening means for resisting transfer of feed from the storage means to the feeding station when sufficient feed has accumulated in the feeding station to satisfy the animal's hunger. In this manner less feed is exposed to the elements than in conventional feeders thereby reducing wastage thereof through rot, decay, etc.

The drawings constitute a part of this specification and include exemplary embodiments of the present invention and illustrate various objects and features thereof.

BRIEF DESCRIPTION OF THE DRAWINGS

FIG. 4 is an enlarged view of the animal feeder detailing one of the feed transfer actuators, showing movement thereof in phantom, and showing a feed transfer mechanism.

FIG. 5 is a partial side elevational view of the animal feeder having the end thereof broken away and showing an animal feeding therein and the resistance bar engaging an accumulation of feed therein.

DETAILED DESCRIPTION OF THE PREFERRED EMBODIMENT

Figure 1:
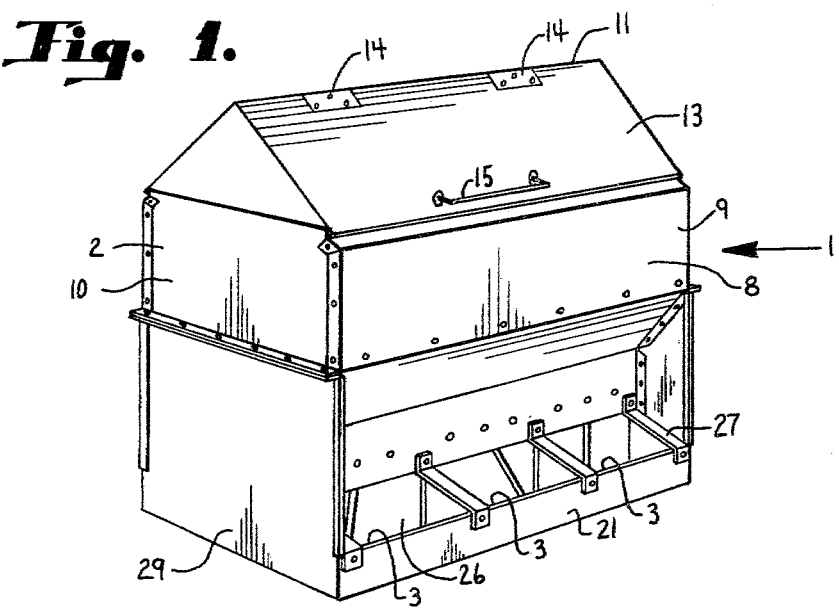
FIG. 1 is an animal feeder embodying the present invention.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

In the illustrated embodiment, the numeral 1 generally represents an animal feeder encompassing the present invention. The animal feeder 1 comprises feed storage means 2, a plurality of feeding stations 3, a conveying means 4, a demand means 5, and a dampening means 6.

The terms "top", "bottom", "upper", "lower", "center", "side", and derivations thereof as used herein for describing portions of the animal feeder are intended to refer to those spatial orientations as depicted in the illustrations. When referring to the feeding stations 3, the term "front" is understood to means the side thereof from which an animal normally feeds and "rear" to mean the opposite side.

The feed storage means 2 comprises a vessel suitable for storing various types of grain and other feed substantially free from damage or spoilage due to the elements, especially rain. As illustrated, the feed storage means 2 is a hopper 8 having parallel front walls 9 and parallel side walls 10 forming a rectangular enclosure, a top 11, and a bottom 12 which merges with the conveying means 4. The hopper top 11 includes a door panel 13 attached to and pivotly connected to the remainder of the top 11 by hinges 14. The door panel 13 also has a handle 15 which facilitates the raising thereof, so that feed 16 as seen in FIGS. 4 and 5, may be placed into the hopper 8. Although as illustrated the storage hopper 8 merges with the remainder of the animal feeder 1 and in particular the conveying means 4, it is foreseen that the storage hopper 8 could be a separate vessel and even be located at a remote location from the remainder of the feeder 1 with the conveying means 4 positioned thereinbetween.

Figure 3:
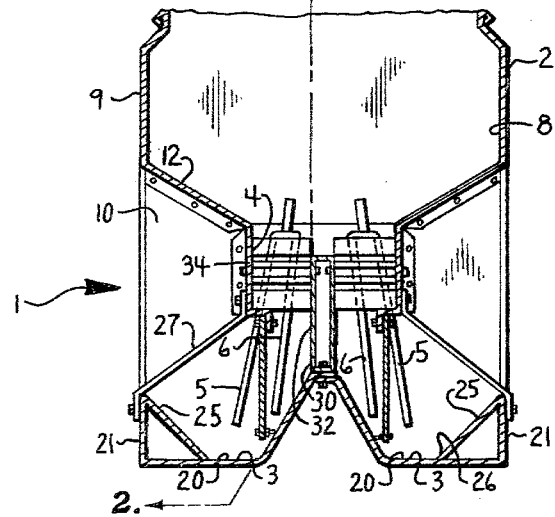
FIG. 3 is a cross sectional view of an animal feeder taken along line 3—3 of FIG. 2 showing the feed transfer actuators and accompanying resistance bars.

Each feeding station 3 may be any suitable receptacle for holding feed 18 which has been transferred from the hopper 8 and allowing an animal 19, shown in phantom in FIG. 5, access thereto, preferably allowing only the head of the animal 19 to actually come in contact with the feed 18. A particular animal feeder 1 may have one or a plurality of such feeding stations 3. In the illustrated embodiment the animal feeder 1 has six feeding stations 3 being equally divided into rearly abutting interconnected groups. As best illustrated in FIGS. 3 and 5, each feeding station 3 has a substantially flat floor portion 20 attached at opposite ends thereof to a vertical front barrier 21 which is sufficiently short to allow the animal 19 to reach thereover and a rear member 22. The rear member 22 slopes upwardly and away from the feeding animal 19. The upper end of the rear member 22 defines a substantially horizontal flange 23 which extends through the middle of the animal feeder 1 between the abutting feeding stations 3 and which joins with the co-positioned flange 23 of the feeding station 3 rearwardly abutting therewith being secured thereto by bolts 24 or the like. A deflector or diverter plate 25 extends from an upper end of the front barrier 21 to a medial position along the floor 20, thereby tending to urge feed 18 accumulated in the feeding station 3 to the rearward side thereof and discouraging a feeding animal 19 from trying to stand within the feeding station 3. In the illustrated embodiment, the floors 20, front barriers 21, rear members 22, and deflector plates 25 of each feeding station 3 are merged together forming one continuous longitudinally connected trough 26. Dividers 27 separate each of the feeding stations 3 and provide structural support between the upper portions of the animal feeder 1 and the front barriers 21.

As is best illustrated in FIG. 1, vertically oriented side panels 29 cover the ends of each trough 26 and provide structural support to the upper portion of the animal feeder 1, especially the hopper 8 which is secured thereto by bolts, rivets, or the like. In addition, a rectangular center support column 30 extends upwardly from the rear member flanges 23 and between the side panels 29, providing structural support for the upper portion of the animal feeder 1 and, in particular, rotatably supporting near an upper end thereof one end of the demand means 5.

Figure 2:
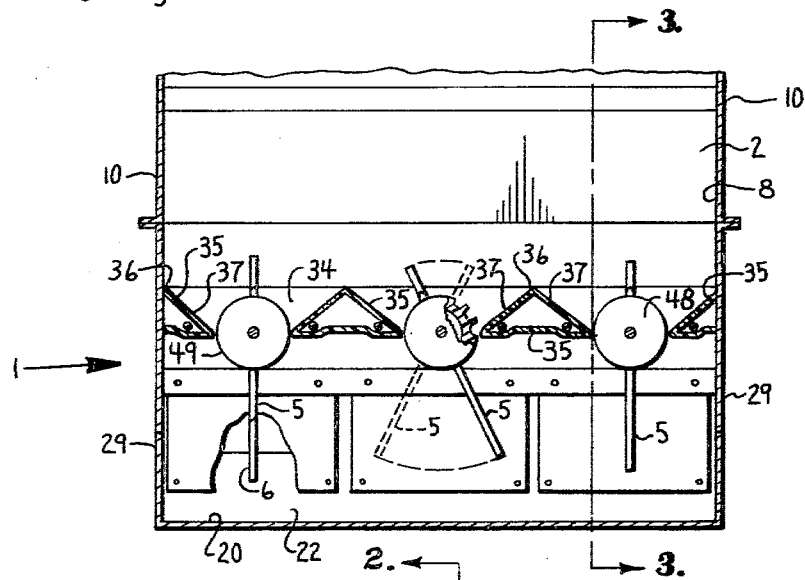
FIG. 2 is a partial cross sectional view of the animal feeder taken along line 2—2, FIG. 3, showing feed transfer actuators and having portions thereof broken away.

The conveying means 4 may comprise any suitable device for transferring stored animal feed 16 from the feed storage means 2 to the feeding stations 3. In the illustrated embodiment the hopper 8 is vertically spaced above the feeding stations 3 and the conveying means 4 comprises a plurality of simple gravity chutes 32 positioned between the hopper 8 and above each of the feeding stations 3 respectively. Each chute 32 merges with the lower portion of the hopper 8 and the upper portion of the respective feeding station 3. The hopper bottom 12 has outer bulkhead sections 33 which run longitudinally between the side panels 29 and slope inwardly from a juncture with the hopper front walls 9 respectively. These bulkhead sections 33 extend partially across the hopper bottom 12 providing a funnel effect which directs the stored feed 16 in the hopper 8 toward the center thereof. The bulkhead sections 13 also merge with the chute 32 to form the upper portion thereof. Longitudinal skirts 34 depend downwardly from the inner and lower edge of the bulkhead sections 33 and extend between the side panels 29. Triangularly shaped director assemblies 35, as best seen in FIGS. 2 and 4, extend traversely between the skirts 34. An apex 36 of each of the director assemblies 35 being positioned to substantially intersect with the lower and inner edge of the bulkhead sections 33. Each of the director assemblies 35 have upper surfaces 37 which slope downwardly from the apex 36 thereof. The director assemblies 35 are spaced apart forming substantially equal and rectangularly shaped apertures 38 therebetween, the upper surfaces 37 thereof thus function as a funnel to urge the stored feed 16 toward the apertures 38. Each aperture 38 is positioned over one of the feeding stations 3 respectively. The upper surfaces 37 and the skirts 34 also both function as a bottom portion of the hopper 8 and an upper portion of the chute 32. Attached along the length of the bottom of each skirt 34, as seen in FIG. 5, is an inwardly directed lip 39 which also has a downwardly directed flange 40 attached to the innermost edge thereof. Depending downward from the flange 40 are baffle plates 41 attached thereto by bolts 42. Each baffle plate 41 extends longitudinally above a rearward portion of each of the feeding stations 3 respectively. Each baffle plate 41 has a lower distal end 43 which extends downwardly near but in spaced relationship to the feeding station rear member 22, thus providing a slot or aperture 45 for transferred feed 18 to pass therebetween. A spacer bolt 46 is attached to the bottom of each side of each of the baffle plates 41 extending rearwardly and horizontally therefrom in such a manner as to engage the feeding station rear member 22. Each of the spacer bolts 46 are adjustable so as to maintain a suitable aperture 45 between the baffle plate 41 and feeding station rear member 22. The baffle plates 41 and support column 30 define therebetween, in conjunction with the side panels 29, a lower portion of the chute 32 which merges with an upper portion of the feeding station 3 and which is restricted from access by the feeding animal 19. Although a particular conveying means 4 has been illustrated and described herein it is foreseen that the conveying means 4 could be of much greater length, separate from the other elements of the feeder 1, or an alternative device from that illustrated. For example, the conveying means could constitute a powered auger within a trough joining a feeding station with a feed storage means positioned at an equivalent or even lower height with respect to the feeding station.

The demand means 5 may comprise any suitable device for substantially restricting the flow of stored animal feed 16 between the storage means 2 and the feeding stations 3, yet allowing the feeding animal 19 to transfer the feed 16 therebetween upon demand by means of physical work. In the illustrated embodiment as best seen in FIGS. 4 and 5, the demand means 5 comprises a demand actuated blocking mechanism 48 in combination with and positioned above each of the feeding stations 3, and includes a cylinder 49. The cylinder 49 has longitudinally extending identations or pockets 50 on the surface thereof. One of the cylinders 49 is positioned above each of the feeding stations 3 in the respective apertures 38 within the chute 32. The diameter and length of each of the cylinders 49 are such as to substantially equal the length and width dimensions of the respective apertures 38, thereby providing a blockage between the upper and lower portions of the chute 32. Each cylinder 49 is rotatably mounted in the aperture 38 by journals 51 and 52, axially extending from opposite ends thereof. As seen in FIG. 5, the journals 51 extend through and are supported by a respective receiver 53 positioned along one of the skirts 34 with a washer 54 being secured to the outer surface thereof to provide extra strength. Indentations 55 in the support columns 30 receive the journals 52 respectively.

The pockets 50 are positioned on opposite sides of the cylinder 49 in slightly spaced apart groupings of three. As illustrated in FIG. 4, the pockets 50 fill with stored animal feed 16 when they are rotated above the apertures 38 and are thus generally open to the cavity formed by the upper portion of the chute 32 and hopper 8. The animal feed 16 disengages or falls from the pockets 50, as is shown by the falling feed 56, due to gravity, when the pockets 50 are rotated so as to open below the aperture 38 or into the lower portion of the chute 32.

The demand means 5, as illustrated, also includes a demand bar or lever 57 extending diametrically through each of the cylinders 49 and downward into the respective feeding stations 3. The demand bar 57 comprises a substantially nonflexible rod suitable for engagement with the body of the feeding animal 19, particularly the head thereof. Movement of the demand bar 57 from side to side by the feeding animal 19, as is illustrated by the phantom movement in FIG. 4, rotates the cylinder 49 in the nature of 45° to 90°, thereby alternatively positioning the pockets 50 above and below the aperture 38, thus actuating the demand mechanism 48. A longitudinal passageway 58 in the lip 39 beneath each cylinder 49 allows free movement of the demand bar 57 back and forth a sufficient distance to properly rotate the pockets 50 but restricts further movement thereof. A cover plate 59 extends over the passageway and is penetrated by the demand bar 57 which slides back and forth therewith, thereby keeping animal feed 56 just released from the pockets 50 from passing therethrough and into the front portion of the respective feeding station 3. It is foreseen that various other types of demand means 5 would be functional herewith. For example, in the above mentioned system using an auger for the conveying means, the demand means may comprise a normally off switch which could be actuated by an animal into an on position, thereby activating the auger.

The resistance or dampening means 6 may comprise any suitable device for sensing accumulations of animal feed 18 within the feeding station 3, especially feed accumulations behind the baffle plates 41, as shown by the feed 61, and for making actuation of the demand means 5 substantially more difficult as such feed accumulates therein. In general, the difficulty of continuing to demand additional feed is made more difficult by the dampening means 6 somewhat in proportion to the level of the accumulation of feed 18, after a minimum level is reached. As illustrated in FIG. 5, the dampening means 6 comprises an elongate resistance projection or bar 62 which is diametrically attached to the cylinder 50 and extends outwardly therefrom into the lower portion of the chute 32 between the respective feeding station baffle plate 41 and the support column 30. The resistance bar 62 has a distal end 63 which preferably extends to within close proximity to the respective feeding station 3 and which engages the accumulation of feed 18 in the feeding station 3 and, in particular, the accumulation of feed 61 which rises into the chute 32 between the baffle plates 41 and the support columns 30. In this manner, as the accumulation of feed 61 raises in the chute 32, the resistance to movement of the resistance bar 62 increases as the feed 61 accumulation level increases, thereby making rotation of the cylinder 49 by the demand bar 57 more difficult. In the illustrated embodiment, the demand bar 57 and the resistance bar 62 are interconnected by a rod 64 near upper ends of each, thereby forming a fork. A bridge breaking bar 65 is also attached to the rod 64 and extends upwardly into the hopper 8 therefrom. The bridge breaking bar 65 is normally shorter than the resistance bar 62 and tends to provide free flow of the stored animal feed 16 into the cylinder pockets 50. It is foreseen that the dampening means 6 may comprise other types of devices which would either substantially increase resistance to the demand bar or substantially reduce the amount of feed transferred between the feed storage means 2 and the feeding station 3 on each actuation of the demand means 5. For example, electronic sensing devices connected to conventional cut-off switches could be used for this purpose.

In use, animal feed 16 is placed in the feed storage means 2 of the animal feeder 1. A hungry animal 19 approaches one of the feeding stations 3 inserting its body, preferably only the head, therein. If there is accumulated feed 18 already in the feeding station 3, as shown in FIG. 5, the feeding animal 19 will preferably eat that feed first. As the accumulated feed 18 and 61 depletes due to such eating, the feeding animal 19 may replenish the supply therein by pushing the demand bar 57 back and forth in a side-to-side motion thereby rotating the respective cylinder 49. Rotation of the demand bar 57 back and forth as shown by the solid and phantom lines in FIGS. 2 and 4, fill the cylinder pockets 50 with stored feed 16, when same are above the respective aperture 38 and deposit feed 56 which falls into the chute 32, when same are below the respective aperture 38. In this manner additional feed 56 is delivered to and accumulates on the feeding station floor 20 as accumulated feed 18. The accumulated feed 18 tends to slope from the rear of the feeding station 3 at an angle somewhat dependent upon the inherent angle of repose thereof, until a position or level near or slightly above the baffle plate distal end 43 is reached. The accumulated feed 18 then begins to back up into the upper part of the feeding station 3 and into chute 32 as shown by the accumulated feed 61. When the resistance bar distal end 63 engages the accumulated feed 61, continued actuation or side-to-side movement of the demand bar 57 by the feeding animal 19 produces a resistance thereagainst. As the accumulated feed 61 rises in the chute 32, an increasingly greater surface area of the resistance bar 62 engages therewith, thus increasing the amount of resistance associated with moving the resistance bar 62 and the attached demand bar 57, hence the amount of work which a feeding animal 19 must expend in order to move or actuate the demand bar 57 increases as the feed 61 accumulates in the feeding station 3. Eventually the work required to move the resistance bar will hopefully discourage the feeding animal 19 from further activation thereof and eliminate the overfilling of the feeding station 3 with accumulated feed 18. The baffle plate 41 may be alternatively positioned at varying distances from the feeding station rear member 22, depending on the flow characteristics and type of feed being used, by adjusting the bolt 46, thereby widening or narrowing the feed flow aperture 45. The bridge breaking bar 65 functions to keep the stored feed 16 flowing evenly into the cylinder pockets 50 during activation of the demand bar 47 by the feeding animal 19.

It is to be understood that while certain embodiments of the present invention have been illustrated and described herein, it is not to be limited to the specific forms or arrangement of parts herein described and shown.

What is claimed and desired to secure by Letters Patent is:

1. A demand-type animal feeder comprising:
   (a) an animal feeding station;
   (b) storing means for storage of feed; said storing means comprising an enclosed hopper positioned above said animal feeding station;
   (c) conveying means for transferring said feed from said storage means to said feeding station; said conveying means comprising a chute attached to and communicating with a lower terminus of said hopper and terminating above said animal feeding station;
   (d) demand means normally blocking transfer of said feed by said conveying means and being adapted to be operatively actuated by work of an animal to allow transfer of said feed by said conveying means; whereby said animal can selectively demand additional feed by actuating said demand means, thereby allowing additional feed to transfer from said storing means to said feeding station; said demand means comprising a rotatable cylinder and an actuator bar; said cylinder substantially forming a block in said chute and having pockets on the surface thereof suitable for holding said feed; said cylinder, being rotatably mounted about the axis thereof, such that said pockets fill with said feed from said hopper when moving upwardly and deposit said feed below said chute block when moving downwardly; said actuator bar depends from said cylinder into said feeding station, such that side to side movement of said actuator bar rotates said cylinder, thereby depositing additional feed in said chute; and
   (e) dampening means for resisting actuation of said demand means by said animal in proportion to increases in the accumulation of said feed in said feeding station, whereby as the accumulation of said feed in said feeding station increases, the work of said animal to demand additional food and actuate said demand means becomes substantially greater.

2. The feeder according to claim 1 wherein:
   (a) said feeding station has a relatively flat floor and a frontal animal barrier; and including
   (b) a diverter angularly positioned between said barrier and said floor such that said animal is discouraged from placing the feet thereof within the feeding station.

3. The feeder according to claim 1 wherein:
   (a) said dampening means hampers movement of said actuator bar in relationship to accumulation of said feed in said feeding station, after a minimal level of said accumulation of the feed is reached.

4. The feeder according to claims 1 or 3 wherein:
   (a) said dampening means comprises an elongate resistance bar depending from said cylinder; and
   (b) said resistance bar is sufficiently long to extend into and engage accumulations of feed in said feeding station.

5. The feeder according to claim 4 including:
   (a) a baffle plate extends downwardly into said feeding station between said actuator bar and said resistance bar;
   (b) said feeding station has a floor; and
   (c) said baffle plate communicates with said feeding station in such a manner as to allow a small accumulation of said feed on said floor and thereafter causes said feed to accumulate between said baffle plate and said feeding station so as to interact with said resistance bar.

6. The feeder according to claim 4 wherein:
   (a) said resistance bar and said demand bar are fixedly connected together near an upper end thereof forming a fork; and
   (b) said fork passes diametrically through said cylinder, whereby movement of said demand bar creates a substantially equivalent movement in said resistance bar.

7. The feeder according to claim 6 wherein:
   (a) said resistance bar depends from said cylinder and comes into relatively close proximity to said feeding station.

8. The feeder according to claim 6 including:
   (a) a bridge breaking bar fixedly attached to said fork and extending into said hopper for breaking up accumulations of feed therein.

* * * * *